(No Model.)
C. M. THOMPSON & C. R. EBERLE.
ELECTRICAL CONDUCTOR.
No. 312,673. Patented Feb. 24, 1885.
Fig. 1
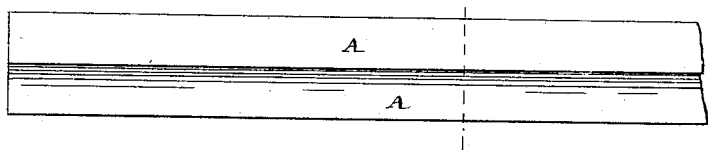
Fig. 2.
Fig. 3.
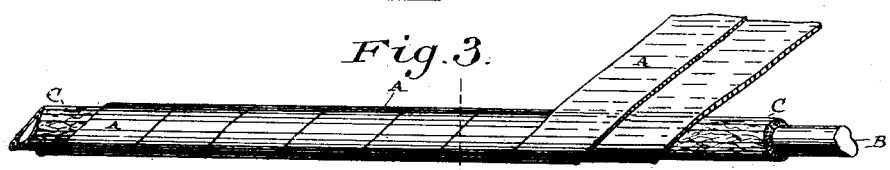
Fig. 4.
Fig. 5.     Fig. 6.
     
Fig. 7.
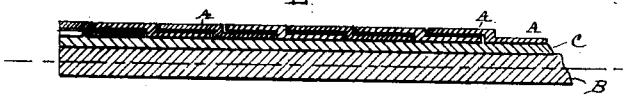
WITNESSES:
George N. Sonneborn
L. F. Gees
INVENTORS
Colin M. Thompson
and
Chas. R. Eberle
BY
Wm G. Button
their
ATTORNEY

UNITED STATES PATENT OFFICE.

COLIN M. THOMPSON AND CHARLES R. EBERLE, OF BROOKLYN, NEW YORK.

ELECTRICAL CONDUCTOR.

SPECIFICATION forming part of Letters Patent No. 312,673, dated February 24, 1885.

Application filed March 19, 1884. (No model.)

*To all whom it may concern:*

Be it known that we, COLIN M. THOMPSON and CHARLES R. EBERLE, citizens of the United States, and both residing at Brooklyn, in the county of Kings and State of New York, have invented certain new and useful Improvements in Electrical Conductors, of which the following is a specification.

Our invention consists in an improvement in compound electrical conductors, providing a wire of low electrical resistance and of great tensile strength, combined with cheapness of manufacture.

We construct our conductors as follows: A core of copper wire or wire of any other metal of low electrical resistance, insulated or not, as required, is covered with an outer casing or armor of steel or other metal of sufficient tensile strength wound helically about the core in thin narrow strips so formed as to overlap and leave a smooth cylindrical exterior surface. The compound wire thus formed is then passed through a bath of molten tin, zinc, or other metal or alloy that melts at a low temperature, the effect being to firmly solder the edges of the strip together, making a continuous hollow cylindrical covering or armor for the inner conducting-wire.

The inner wire may be covered with an insulating-coating, for which purpose we use asbestus preferably, though any substance not injured by the heat used in soldering the armor may be applied. If no insulated coating is used for inner wire, the wire must be coated with tin or some similar metal to protect it from injury by direct contact with the steel or iron covering, as this has been proved by experience to be the result. If the inner wire is insulated, there are practically two conductors—the inner wire, which is always protected from leakage or escape, and the outer casing, which is as good a conductor as the ordinary iron wires in use, and only subjected to the losses incident to such wires. Whether the inner wire is insulated or not, the helical outer coating of iron or steel gives sufficient tensile strength to sustain the copper or main conductor, which may be small or of only sufficient size to carry the current required. The iron itself will also materially assist in the conduction.

Compound wires as ordinarily made, with a core of steel and a copper outer coating, are defective, because the copper and steel have very different rates of expansion, and this, as well as the fact that copper stretches more than steel, results in the partial separation of the two metals and eventually destroys or injures the wire by producing breaks or scaling. With our wire there is not this difficulty, because the two metals are not rigidly attached, and, being free to expand independently, and the stronger and more elastic metal outside, the core receives but very little permanent set, and, in fact, the core expands very nearly the same as the outside, because, though its coefficient of expansion is greater, it does not receive as much heat as the outer metal.

The covering-strip is preferably made of thin sheet iron or steel rolled with a double flange, as shown in the drawings, though I do not confine myself to that form. The strip is so rolled that one half of its width is the thickness of the metal above the other half and parallel to it. The proportions of the flanges may be varied; but it is desirable to make them equal, because in that way the surface is left smooth and the armor is of uniform thickness.

In the drawings, Figure 1 is a side view of the wrapping-strip, and Fig. 2 a cross-section of it. Fig. 3 is a perspective view of the whole conductor, of the kind in which the inner wire is insulated. Fig. 4 is a perspective view of the conductor of the kind in which the inner wire is not insulated. Figs. 5 and 6 are cross-sections of the conductors. Fig. 7 is a longitudinal section of the conductor, showing the lapping of the strip.

A is the wrapping-strip. B is the core-wire. C is the insulating-coating.

Having now fully described our invention, what we claim, and desire to secure by Letters Patent, is—

1. A compound electrical conductor consisting of a core of copper or other metal of low electrical resistance and incased in a helically-wound strip of iron or steel with overlapping joints secured by solder, the said strip consisting of two equal parallel portions, one portion being raised the thickness of the metal above the other, substantially as shown and described.

2. A compound electrical conductor consisting of a core of copper or other metal of low electrical resistance, in combination with an insulating-coating and helically-wound outer armor of iron or steel with overlapping soldered joints.

3. A compound electrical conductor consisting of a core of copper or other metal of low electrical resistance and an outer armor of spirally or helically wound iron or steel strips secured by solder, with an intermediate layer of asbestus or other insulating material uninjured by heat.

In witness whereof we have hereunto set our hands.

COLIN M. THOMPSON.
CHARLES R. EBERLE.

Witnesses:
GEORGE H. SONNEBORN,
HOMER R. BALDWIN.